United States Patent
Reial et al.

(10) Patent No.: US 11,647,464 B2
(45) Date of Patent: May 9, 2023

(54) WAKE-UP DCI FOR WIRELESS DEVICES IN CONNECTED MODE

(71) Applicant: Telefonaktiebolaget LM Ericsson (publ), Stockholm (SE)

(72) Inventors: Andres Reial, Lomma (SE); Sina Maleki, Malmö (SE); Yutao Sui, Solna (SE); Johan Rune, Lidingö (SE); Niklas Andgart, Södra Sandby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 82 days.

(21) Appl. No.: 17/279,963

(22) PCT Filed: Sep. 26, 2019

(86) PCT No.: PCT/EP2019/076036
§ 371 (c)(1),
(2) Date: Mar. 25, 2021

(87) PCT Pub. No.: WO2020/064930
PCT Pub. Date: Apr. 2, 2020

(65) Prior Publication Data
US 2021/0392584 A1    Dec. 16, 2021

Related U.S. Application Data

(60) Provisional application No. 62/738,345, filed on Sep. 28, 2018.

(51) Int. Cl.
*H04W 52/02* (2009.01)
*H04W 76/28* (2018.01)
(Continued)

(52) U.S. Cl.
CPC ... *H04W 52/0235* (2013.01); *H04W 52/0212* (2013.01); *H04W 72/1289* (2013.01); *H04W 76/27* (2018.02); *H04W 76/28* (2018.02)

(58) Field of Classification Search
CPC ......... H04W 52/0235; H04W 52/0212; H04W 72/1289; H04W 76/27; H04W 76/28; Y02D 30/70
See application file for complete search history.

(56) References Cited

U.S. PATENT DOCUMENTS

2018/0098287 A1* 4/2018 Ang .................. H04W 76/28
2018/0132176 A1* 5/2018 Abraham .......... H04W 52/0235
(Continued)

FOREIGN PATENT DOCUMENTS

WO    2018175760 A1    9/2018
WO    2019032016 A1    2/2019

OTHER PUBLICATIONS

3GPP TSG RAN WG1 Meeting #89; R1-1708072; Source: Nokia, Alcatel-Lucent Shanghai Bell; Title: Signaling for efficient decoding of physical channels, Hangzhou, P.R. China, May 15-19, 2017. (Year: 2017).*

(Continued)

*Primary Examiner* — Hassan A Phillips
*Assistant Examiner* — Mohammed S Chowdhury
(74) *Attorney, Agent, or Firm* — Christopher & Weisberg, P.A.

(57) ABSTRACT

A method, system and apparatus are disclosed. In one or more embodiments, a network node configured to communicate with a wireless device (WD) is provided. The network node is configured to configure a wireless device with a wake-up indication, the wake-up indication configured to cause the wireless device to transition out of at least one of a low power mode or connected Discontinuous Reception (DRX) mode based on the wake-up indication. The network node is configured to signal the wake-up indication in a search space in a physical downlink control channel.

18 Claims, 11 Drawing Sheets

(51) Int. Cl.
  *H04W 76/27* (2018.01)
  *H04W 72/12* (2009.01)

(56) References Cited

U.S. PATENT DOCUMENTS

| | | | |
|---|---|---|---|
| 2020/0037396 A1* | 1/2020 | Islam | H04W 88/06 |
| 2021/0259044 A1* | 8/2021 | Islam | H04W 52/0235 |
| 2021/0314866 A1* | 10/2021 | Lee | H04W 76/28 |
| 2022/0039009 A1* | 2/2022 | Iyer | H04W 72/044 |

OTHER PUBLICATIONS

International Search Report and Written Opinion dated Nov. 19, 2019 for International Application No. PCT/EP2019/076036 filed Sep. 26, 2019, consisting of 9-pages.
3GPP TSG-RAN WG1 Meeting #95 R1-1813183; Title: Triggers of NR UE power saving; Agenda Item: 7.2.9.2.2; Source: Ericsson; Document for: Discussion and Decision; Date and Location: Nov. 12-16, 2018, Spokane, USA, consisting of 5-pages.
3GPP TSG RAN WG1 Meeting #89 R1-1708072; Title: Signalling for efficient decoding of physical channels; Agenda Item: 6.2.7.1.1; Source: Nokia, Alcatel-Lucent Shanghai Bell; Document for: Discussion and Decision; Date and Location: May 15-19, 2017, Hangzhou, China, consisting of 6-pages.
3GPP TSG RAN WG1 Meeting #92bis R1-1804740; Title: On compact DCI format for NR URLLC; Agenda Item: 7.2.2; Source: Intel Corporation; Document for: Discussion and Decision; Date and Location: Apr. 16-20, 2018, Sanya, China, consisting of 7-pages.
3GPP TS 38.211 V15.6.0; 3rd Generation Partnership Project; Technical Specification Group Radio Access Network NR; Physical channels and modulation (Release 15), Jun. 2019, consisting of 97-pages.
3GPP TSG-RAN WG1 Meeting #90 R1-1712621; Title: Power consumption reduction for paging and connected-mode DRX for NB-IoT; Agenda Item: 5.2.7.1.1; Source: Ericsson; Document for: Discussion, Decision; Date and Location: Aug. 21-25, 2017, Prague, Czech Republic, consisting of 9-pages.
3GPP TS 38.213 V15.2.0; 3rd Generation Partnership Project; Technical Specification Group Radio Access Network: NR; Physical layer procedures for control (Release 15), Jun. 2018, consisting of 99-pages.
3GPP TS 38.214 V15.2.0; 3rd Generation Partnership Project; Technical Specification Group Radio Access Network; NR; Physical layer procedures for data (Release 15), Jun. 2018, consisting of 95-pages.
Korean Office Action with English Summary Translation dated Jan. 19, 2022 for Korean Patent Application No. 20217010199, consisting of 10-pages.
EPO Communication dated Feb. 25, 2022 for Patent Application No. 19779839.0, consisting of 7-pages.
3GPP TSG-RAN1#88bis R1-1705192; Title: Power consumption reduction for paging and connected-mode DRX; Agenda Item: 7.2.6 2; Source: Ericsson; Document for: Decision; Date and Location: Apr. 3-7, 2017, Spokane, Washington, USA, consisting of 4-pages.

* cited by examiner

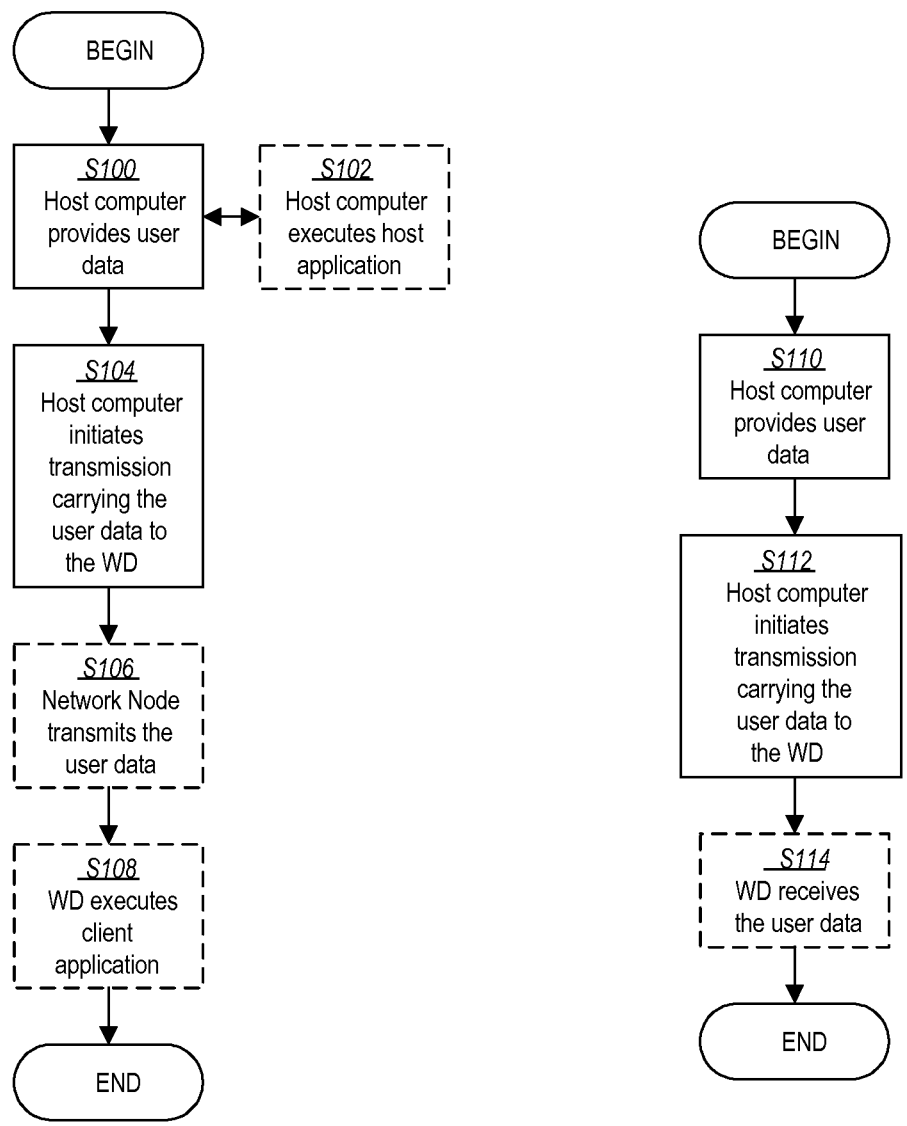

WAKE-UP DCI FOR WIRELESS DEVICES IN CONNECTED MODE

CROSS-REFERENCE TO RELATED APPLICATIONS

This application is a Submission Under 35 U.S.C. § 371 for U.S. National Stage Patent Application of International Application No.: PCT/EP2019/076036, filed Sep. 26, 2019 entitled "WAKE-UP DCI FOR WIRELESS DEVICES IN CONNECTED MODE," which claims priority to U.S. Provisional Application No. 62/738,345, filed Sep. 28, 2018, entitled "WAKE-UP DOWNLINK CONTROL INFORMATION (DCI) FOR WIRELESS DEVICES IN CONNECTED MODE," the entireties of both of which are incorporated herein by reference.

TECHNICAL FIELD

Wireless communication and in particular, to a wake-up indication in a search space in a physical downlink control channel where the wake-up indication is configured to cause the wireless device to transition out of a low power mode or connected Discontinuous Reception (DRX) mode.

BACKGROUND

One activity in Radio Resource Control (RRC)_CONNECTED mode for wireless network communication is monitoring Physical Downlink Control Channel (PDCCH) for scheduled Physical Downlink Shared Channel (PDSCH) where all PDCCH occasions/Time/Frequency (TF) locations/configurations may need to be decoded according to search space. After decoding according to each blind decoding (BD) option, the wireless device can check whether the PDCCH was meant for the wireless device, based on checking the Cyclic Redundancy Check (CRC) using the wireless device's c-Radio Network Temporary Identifier (RNTI).

Wake-up Signal/Wake-up Signaling (WUS) are employed in Narrowband Internet of Things (NB-IoT) and Long Term Evolution (LTE)-Machine Type Communication (MTC) (LTE-M), e.g., to wake up the wireless device ahead of paging occasions in idle. In NB-IoT and LTE-M, a Zadoff-Chu (ZC) based sequence is used as the WUS. When the WUS is configured in a cell, and the wireless device supports the operation of WUS, the wireless device first detected the WUS prior its paging occasion (PO). If WUS is detected, the wireless device proceeds to decoding the paging Downlink Control Information (DCI). If the WUS is not detected, the wireless device goes back to sleep. As WUS is significantly shorter than the paging DCI, WUS saves wireless device power, as the expected paging load in NB-IoT and LTE-M is low.

During the 3$^{rd}$ Generation Partnership Project (3GPP) study of WUS in NB-IoT and LTE-M, the concept of using a compact DCI was discussed. That is to use a DCI smaller than the regular paging DCI with the expectation that the compact DCI can be decoded within a shorter time, and therefore saves the wireless device energy. But as the energy saving performance of compact DCI was not desirable, the idea of using the compact DCI was not pursued in the study with respect to NB-IoT and LTE-M.

Wireless Device Power Consumption

Wireless device power consumption is a metric for consideration. In general, significant power can be spent on monitoring the PDCCH in LTE based on one DRX setting from LTE field logs. The situation can be similar in New Radio (NR)(also referred to as 5G) if similar DRX setting with traffic modeling is utilized, as the wireless device needs to perform blind detection in its configured control resource sets (CORESETs) to identify whether there is a PDCCH sent to it, and act accordingly. Techniques that can reduce unnecessary PDCCH monitoring or allowing the wireless device to go to sleep or wake-up only when required can be beneficial.

New Radio (NR)

The New Radio (NR) (also known as "5G") standard in the Third Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. FIG. 1 illustrates a radio resource example in NR. In NR, in addition, to transmission in a slot, a mini-slot transmission is also allowed to reduce latency. A mini-slot may consist of any number of 1 to 14 Orthogonal Frequency-Division Multiplexing (OFDM) symbols. It should be noted that the concepts of slot and mini-slot are not specific to a specific service, meaning that a mini-slot may be used for either eMBB, URLLC, or other services.

In 3GPP Release 15 (Rel-15) NR, a wireless device can be configured with up to four carrier bandwidth parts (BWPs) in the downlink with a single downlink carrier bandwidth part being active at a given time. A wireless device can be configured with up to four carrier bandwidth parts in the uplink with a single uplink carrier bandwidth part being active at a given time. If a wireless device is configured with a supplementary uplink, the wireless device can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWP_j}^{size}-1$, where is the index of the carrier bandwidth part. A resource block (RB) is defined as 12 consecutive subcarriers in the frequency domain.

Numerologies: Multiple orthogonal frequency-division multiplexing (OFDM) numerologies, $\mu$, are supported in NR as shown in Table 1, where the subcarrier spacing, $\Delta f$, and the cyclic prefix for a carrier bandwidth part are configured by different higher layer parameters for downlink (DL) and uplink (UL), respectively.

TABLE 1

Supported transmission numerologies

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following downlink physical channels are defined:

Physical Downlink Shared Channel, PDSCH
Physical Broadcast Channel, PBCH
Physical Downlink Control Channel, PDCCH:

PDSCH is the main physical channel used for unicast downlink data transmission, but also for transmission of RAR (random access response), certain system information blocks, and paging information. PBCH carries the basic system information, required by the wireless device to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:

Physical Uplink Shared Channel, PUSCH;
Physical Uplink Control Channel, PUCCH; and
Physical Random Access Channel, PRACH.

PUSCH is the uplink counterpart to the PDSCH. PUCCH is used by wireless devices to transmit uplink control information, including HARQ acknowledgments, channel state information reports, etc. PRACH is used for random access preamble transmission.

An example contents of a DL DCI 1-0 is shown below.
Example contents of a DCI format 1_0 with CRC scrambled by C-RNTI/CS_RNTI
Identifier for DCI formats—1 bit;
  The value of this bit field is always set to 1, indicating a DL DCI format;
Frequency domain resource assignment—$\lceil \log_2 (N_{RB}^{DL,BWP}(N_{RB}^{DL,BWP}+1)/2) \rceil$ bits;
  $N_{RB}^{DL,BWP}$ is the size of the active DL bandwidth part in case DCI format 1_0 is monitored in the wireless device specific search space and satisfying;
    the total number of different DCI sizes configured to monitor is no more than 4 for the cell;
    the total number of different DCI sizes with C-RNTI configured to monitor is no more than 3 for the cell;
  otherwise, $N_{RB}^{DL,BWP}$ is the size of CORESET 0;
Time domain resource assignment—4 bits as defined for example in Subclause 5.1.2.1 of 3GPP Technical Specification (TS) 38.214;
VRB-to-PRB mapping—1 bit for example according to Table 7.3.1.1.2-33 of for example 3GPP TS 38.214;
Modulation and coding scheme—5 bits as defined for example in Subclause 5.1.3 of 3GPP TS 38.214;
New data indicator—1 bit;
Redundancy version—2 bits as defined for example in Table 7.3.1.1.1-2;
HARQ process number—4 bits;
Downlink assignment index—2 bits as defined for example in Subclause 9.1.3 of 3GPP TS 38.213, as counter DAI;
TPC command for scheduled PUCCH—2 bits as defined for example in Subclause 7.2.1 of 3GPP TS 38.213;
PUCCH resource indicator—3 bits as defined for example in Subclause 9.2.3 of 3GPP TS 38.213;
PDSCH-to-HARQ feedback timing indicator—3 bits as defined for example in Subclause 9.2.3 of 3GPP TS 38.213].

DRX

DRX (Discontinuous reception): Simplified DRX operation is shown in FIG. 2, where DRX allows the wireless device to transition to a lower power state where the wireless device is not required to receive any transmission from the network node. There is an onDuration where the wireless device is awake and monitors for control channels, and if there is no control message detected by the wireless device, an Inactivity timer begins, and the wireless device continues to monitor for control channel until a valid control message addressed to the wireless device is received or the inactivity timer expires. If the wireless device receives a valid control message, it extends the Inactivity timer and continues to monitor the PDCCH. If the inactivity timer expires then wireless device can stop receiving transmissions from the network node (e.g., no control monitoring) until end of the DRX cycle. Typically, the DRX parameters are configured by RRC and there are some other DRX parameters including RTT related, HARQ related, etc. On duration and the time duration when inactivity timer is running is also generally referred to as active time.

The following terms are typically associated with DRX operation:

Active Time: Time related to DRX operation, during which the MAC entity monitors the PDCCH.
DRX Cycle: Specifies the periodic repetition of the On Duration followed by a possible period of inactivity (see FIG. 1 below).
Inactivity Timer: Generally, refers to the number of consecutive PDCCH-subframe(s)/slots after the subframe/slot in which a PDCCH indicates an initial UL, DL or SL user data transmission for a MAC entity.
MAC entity is the medium access control entity, and there is one MAC entity per configured cell group, for example the master cell group and secondary cell group.

SUMMARY

Some embodiments advantageously provide methods, systems, and apparatuses for a wake-up indication in a search space in a physical downlink control channel where the wake-up indication is configured to cause the wireless device to transition out of a low power mode or connected Discontinuous Reception (DRX) mode.

A wake-up (WU)-downlink control information (DCI), i.e., wake-up indication, is used to wake up a wireless device (or a group of wireless devices) in connected mode ahead of a PDCCH transmission that schedules data to the relevant wireless devices (or to one or more wireless devices in the group).

In one or more embodiments, the WU-DCI is configured as a separate PDCCH transmission with a narrow BW and small search space. In one or more embodiments, the WUS-PDCCH precedes the scheduling PDCCH transmission by a sufficient number of symbols/slots to allow the full-power receiver to be activated and stabilized in time for receiving the scheduling PDCCH.

In one or more embodiments, the WUS may be transmitted selectively by the NW only when faster-than-CDRX response is required.

In one or more embodiments, the WUS is configured together with, or optionally replacing, the configuration. The wireless device may thus be in RRC_CONNECTED state, possibly a new variant of the state, e.g. a sub-state, but the WUS may also be configured for a wireless device in a low-power/energy-saving state, such as RRC_IDLE state or another, possibly new low-power/energy-saving state.

One aspect is that DRX functionality is configured by RRC, which is typically operating on a slower scale than MAC or Physical layer. Thus, the DRX parameter settings, etc. cannot be changed quite adaptively through RRC configuration, especially if the wireless device has a mix of traffic types.

Wireless device energy consumption in connected mode, related to DL operation, depends predominantly on the RX ON time. Mechanisms may be employed to allow the wireless device to transition to a low-power mode during periods of inactivity. However, the mechanisms have various constraints that limit their effectiveness. The criterion for turning OFF the RX is inactivity, so the wireless device may waste a part of its inactivity interval in full-power mode. Furthermore, the cycle period imposes an inherent delay constraint, as DL packets may be sent only after the off-interval ends.

The signal monitoring bandwidth (BW) in the wireless device receiver may strongly affect the power consumption. Therefore, the WUS approach based on monitoring a scheduling PDCCH may be inefficient, as the scheduling PDCCH search space must be kept relatively broad in frequency to ensure sufficient scheduling capacity and allow the scheduler the necessary degrees of freedom.

According to one aspect of the present disclosure, a method implemented in a wireless device, WD, is provided. The method includes receiving a wake-up indication in a search space in a physical downlink control channel. The method includes transitioning out of at least one of a low power mode and a connected Discontinuous Reception, DRX, mode based on the wake-up indication.

In some embodiments of this aspect, receiving the wake-up indication further includes receiving the wake-up indication before a physical downlink control channel transmission that schedules data for the wireless device. In some embodiments of this aspect, the wake-up indication is wake-up downlink control information, WU-DCI. In some embodiments of this aspect, receiving the wake-up indication further includes receiving the wake-up indication as part of a physical downlink control channel transmission that is separate from another physical downlink control channel transmission that schedules data to the wireless device. In some embodiments of this aspect, receiving the wake-up indication further includes receiving the wake-up indication in at least one of a narrow bandwidth and a narrow search space. In some embodiments of this aspect, receiving the wake-up indication further includes performing a cyclic redundancy check, CRC, using a radio network temporary identifier associated with the wireless device. In some embodiments of this aspect, receiving the wake-up indication further includes performing a cyclic redundancy check, CRC, using a radio network temporary identifier associated with a wake-up group, the wireless device being a part of the wake-up group. In some embodiments of this aspect, the received wake-up indication includes dummy data. In some embodiments of this aspect, the received wake-up indication includes information about downlink data that the wireless device can expect to receive before transitioning back to the at least one of the low power mode and the connected DRX mode. In some embodiments of this aspect, the method further includes receiving, from a network node, a configuration of the wake-up indication, the configuration indicating a timing offset between the received wake-up indication and a physical downlink control channel transmission that schedules data for the wireless device.

According to another aspect of the present disclosure, a method implemented by a network node is provided. The method includes configuring a wireless device with a wake-up indication, the wake-up indication configured to cause the wireless device to transition out of at least one of a low power mode or connected Discontinuous Reception (DRX) mode based on the wake-up indication. The method includes signaling the wake-up indication in a search space in a physical downlink control channel.

In some embodiments of this aspect, signaling the wake-up indication further includes signaling the wake-up indication before a physical downlink control channel transmission that schedules data for the wireless device. In some embodiments of this aspect, the wake-up indication is wake-up downlink control information, WU-DCI. In some embodiments of this aspect, signaling the wake-up indication further includes signaling the wake-up indication as part of a physical downlink control channel transmission that is separate from another physical downlink control channel transmission that schedules data to the wireless device. In some embodiments of this aspect, signaling the wake-up indication further includes signaling the wake-up indication in at least one of a narrow bandwidth and a narrow search space. In some embodiments of this aspect, signaling the wake-up indication further includes signaling the wake-up indication having a cyclic redundancy check, CRC, scrambled using a radio network temporary identifier associated with the wireless device. In some embodiments of this aspect, signaling the wake-up indication further includes signaling the wake-up indication having a cyclic redundancy check, CRC, scrambled using a radio network temporary identifier associated with a wake-up group, the wireless device being a part of the wake-up group. In some embodiments of this aspect, signaling the wake-up indication further includes signaling the wake-up indication as having dummy data. In some embodiments of this aspect, signaling the wake-up indication further includes signaling the wake-up indication as having information about downlink data that the wireless device can expect to receive before transitioning back to the at least one of the low power mode and the connected DRX mode. In some embodiments of this aspect, the configuration of the wake-up indication indicates a timing offset between the signaled wake-up indication and a physical downlink control channel transmission that schedules data for the wireless device.

According to another aspect of the present disclosure, a wireless device, WD, configured to communicate with a network node is provided. The wireless device includes processing circuitry. The processing circuitry is configured to cause the wireless device to receive a wake-up indication in a search space in a physical downlink control channel. The processing circuitry is configured to cause the wireless device to transition out of at least one of a low power mode and a connected Discontinuous Reception, DRX, mode based on the wake-up indication.

In some embodiments of this aspect, the processing circuitry is further configured to cause the wireless device to receive the wake-up indication by being configured to cause the wireless device to receive the wake-up indication before a physical downlink control channel transmission that schedules data for the wireless device. In some embodiments of this aspect, the wake-up indication is wake-up downlink control information, WU-DCI. In some embodiments of this aspect, the processing circuitry is further configured to cause the wireless device to receive the wake-up indication by being configured to cause the wireless device to receive the wake-up indication as part of a physical downlink control channel transmission that is separate from another physical downlink control channel transmission that schedules data to the wireless device. In some embodiments of this aspect, the processing circuitry is further configured to cause the wireless device to receive the wake-up indication by being configured to cause the wireless device to receive the wake-up indication in at least one of a narrow bandwidth and a narrow search space. In some embodiments of this aspect, the processing circuitry is further configured to cause the wireless device to receive the wake-up indication by being configured to cause the wireless device to perform a cyclic redundancy check, CRC, using a radio network temporary identifier associated with the wireless device. In some embodiments of this aspect, the processing circuitry is further configured to cause the wireless device to receive the wake-up indication by being configured to cause the wireless device to perform a cyclic redundancy check, CRC, using a radio network temporary identifier associated with a wake-up group, the wireless device being a part of the wake-up group. In some embodiments of this aspect, the received wake-up indication includes dummy data. In some embodiments of this aspect, the received wake-up indication includes information about downlink data that the wireless device can expect to receive before transitioning back to the at least one of the low power mode and the connected DRX mode. In some embodiments of this aspect, the processing circuitry is further configured to cause the wireless device to receive, from the network node, a configuration of the wake-up indication, the configuration indicating a timing offset between the received wake-up indication and a physical downlink control channel transmission that schedules data for the wireless device.

According to yet another aspect of the present disclosure, a network node configured to communicate with a wireless device, WD, is provided. The network node includes processing circuitry. The processing circuitry is configured to cause the network node to configure the wireless device with a wake-up indication, the wake-up indication configured to cause the wireless device to transition out of at least one of a low power mode or connected Discontinuous Reception (DRX) mode based on the wake-up indication. The processing circuitry is configured to cause the network node to signal the wake-up indication in a search space in a physical downlink control channel.

In some embodiments of this aspect, the processing circuitry is further configured to cause the network node to signal the wake-up indication by being further configured to cause the network node to signal the wake-up indication before a physical downlink control channel transmission that schedules data for the wireless device. In some embodiments of this aspect, the wake-up indication is wake-up downlink control information, WU-DCI. In some embodiments of this aspect, the processing circuitry is further configured to cause the network node to signal the wake-up indication by being further configured to cause the network node to signal the wake-up indication as part of a physical downlink control channel transmission that is separate from another physical downlink control channel transmission that schedules data to the wireless device. In some embodiments of this aspect, the processing circuitry is further configured to cause the network node to signal the wake-up indication by being further configured to cause the network node to signal the wake-up indication in at least one of a narrow bandwidth and a narrow search space. In some embodiments of this aspect, the processing circuitry is further configured to cause the network node to signal the wake-up indication by being further configured to cause the network node to signal the wake-up indication having a cyclic redundancy check, CRC, scrambled using a radio network temporary identifier associated with the wireless device. In some embodiments of this aspect, the processing circuitry is further configured to cause the network node to signal the wake-up indication by being further configured to cause the network node to signal the wake-up indication having a cyclic redundancy check, CRC, scrambled using a radio network temporary identifier associated with a wake-up group, the wireless device being a part of the wake-up group. In some embodiments of this aspect, the processing circuitry is further configured to cause the network node to signal the wake-up indication by being further configured to cause the network node to signal the wake-up indication as having dummy data. In some embodiments of this aspect, the processing circuitry is further configured to cause the network node to signal the wake-up indication by being further configured to cause the network node to signal the wake-up indication as having information about downlink data that the wireless device can expect to receive before transitioning back to the at least one of the low power mode and the connected DRX mode. In some embodiments of this aspect, the configuration of the wake-up indication indicates a timing offset between the signaled wake-up indication and a physical downlink control channel transmission that schedules data for the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flow chart illustrating exemplary methods implemented in a communication system including a host computer, a network node and a wireless device for executing a client application at a wireless device according to some embodiments of the present disclosure;

FIG. 6 is a flow chart illustrating exemplary methods implemented in a communication system including a host computer, a network node and a wireless device for receiving user data at a wireless device according to some embodiments of the present disclosure;

DETAILED DESCRIPTION

Figure 1:
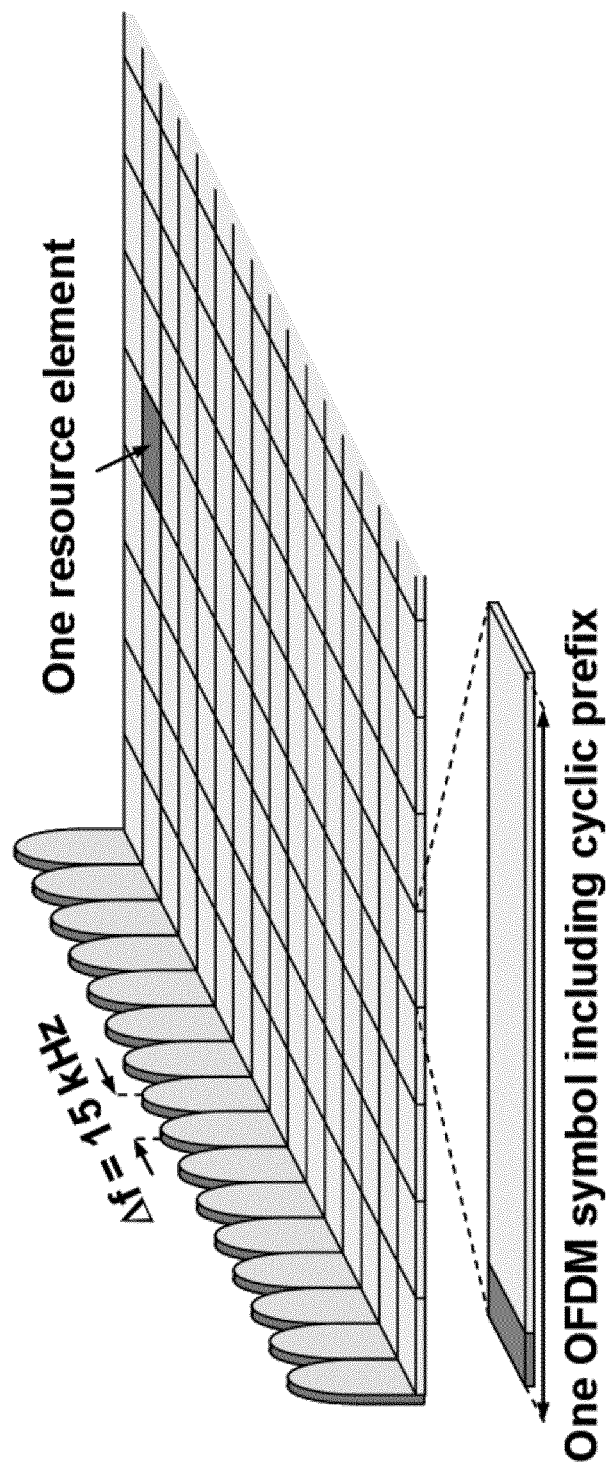
FIG. 1 is a radio resource in NR.
Figure 2:
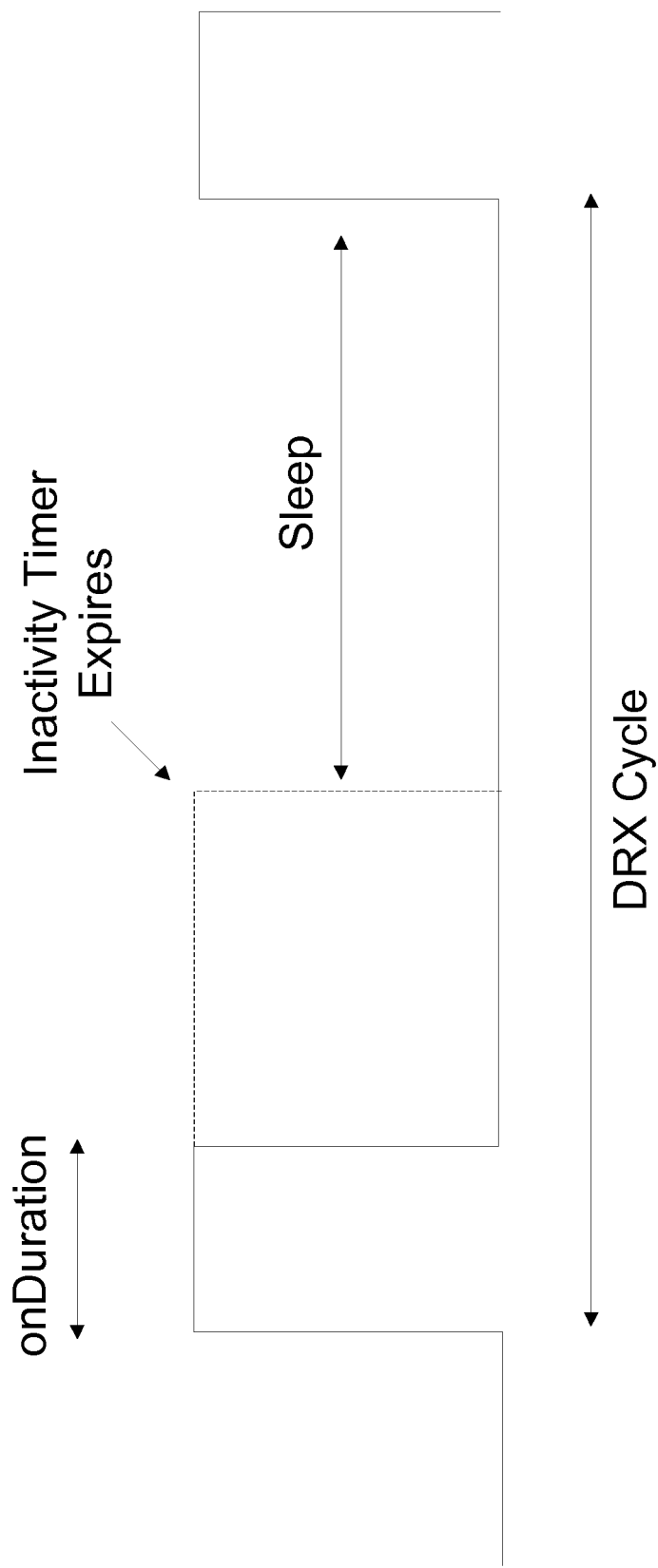
FIG. 2 is an example of DXR.

The instant disclosure provides a mechanism for PDCCH monitoring effectivization that can reduce the receiver on-time and allow narrow-BW operation during at least some of the time.

The instant disclosure solves at least a portion of the problems with at least one existing system at least in part by providing a mechanism for initiating a DL packet transmission to a wireless device in CDRX that overrides the usual CDRX latency impact. The WUS, described herein in accordance with the teachings of the disclosure, allows fast wireless device activation with the low network (NW) overhead and low wireless device monitoring complexity.

Another advantage provided by the teachings of the disclosure is to reduce the number of dummy PDCCH monitoring instances with no grants, thereby saving wireless device power consumption. In other words, the wireless device may be configured with longer CDRX OFF states, reducing PDCCH monitoring but not compromising latency.

Before describing in detail exemplary embodiments, it is noted that the embodiments reside primarily in combinations of apparatus components and processing steps related to a wake-up indication in a search space in a physical downlink control channel where the wake-up indication is configured to cause the wireless device to transition out of a low power mode or connected Discontinuous Reception (DRX) mode. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

In some embodiments, the term "narrow" is used (e.g., narrow bandwidth, narrow search space) and may be used to refer to wake-up indication resources (e.g., bandwidth, search space, etc. for a wake-up DCI) that are narrower as compared to another physical downlink control channel transmission (e.g., scheduling DCI) that schedules data for the WD.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 22) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide a wake-up indication in a search space in a physical downlink control channel where the wake-up indication is configured to cause the wireless device to transition out of a low power mode or connected Discontinuous Reception (DRX) mode.

Figure 3:
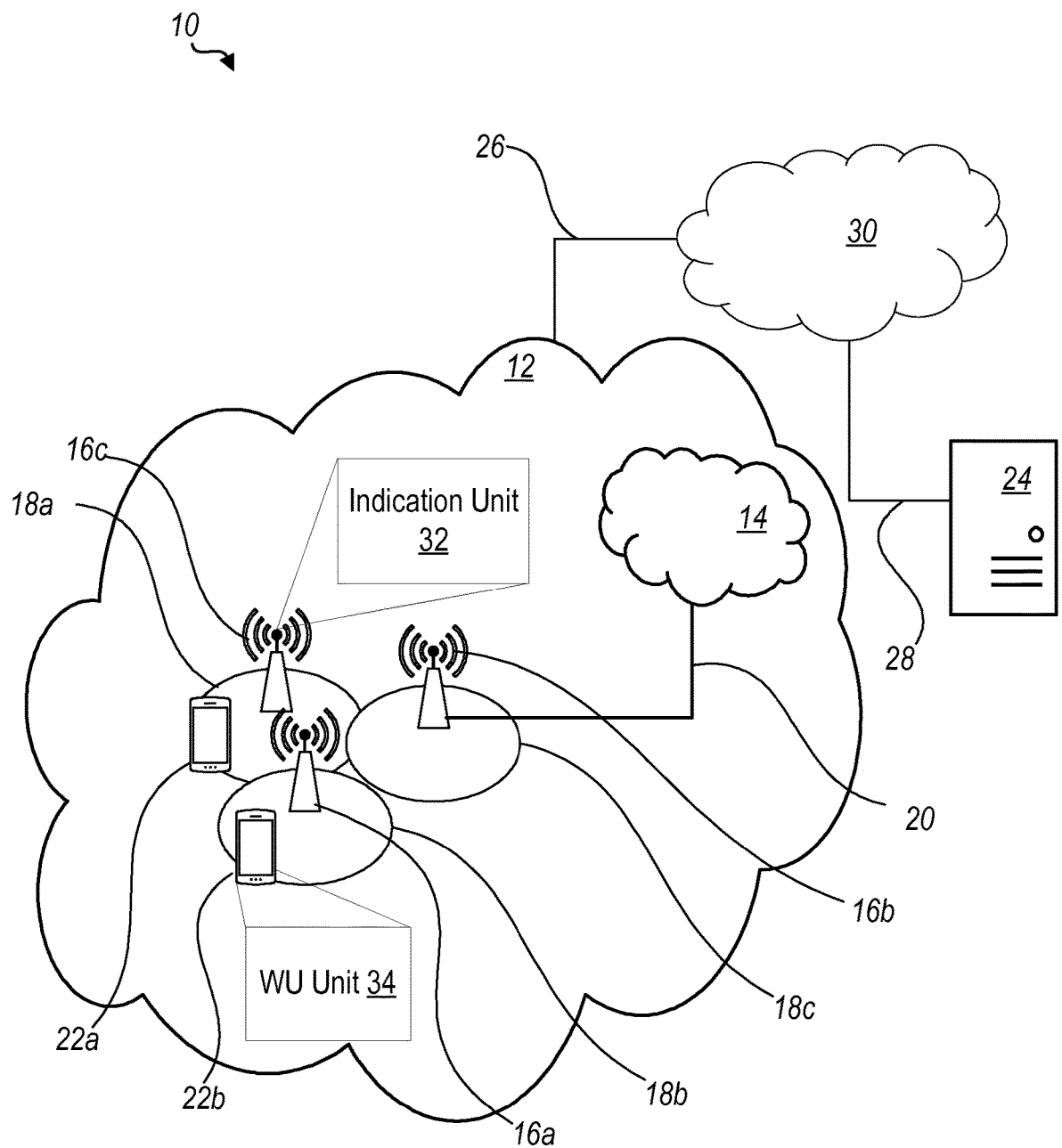
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an indication unit 32 which is configured to signal a wake-up indication in a search space in a physical downlink control channel where the wake-up indication is configured to cause the wireless device to transition out of a low power mode or connected Discontinuous Reception (DRX) mode. A wireless device 22 is configured to include a WU unit 34 which is configured to transition out of a low power mode or connected Discontinuous Reception (DRX) mode based on a wake-up indication in a search space in a physical downlink control channel.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50.

The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to transmit, receive and/or communication information associated with the wake-up indication to one or more of WD 22, network node 16 and another entity in the communication system.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by the network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to signal a wake-up indication in a search space in a physical downlink control channel where the wake-up indication is configured to cause the wireless device to transition out of a low power mode or connected Discontinuous Reception (DRX) mode.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a WU unit 34 configured transition out of a low power mode or connected Discontinuous Reception (DRX) mode based on a wake-up indication in a search space in a physical downlink control channel.

Figure 4:
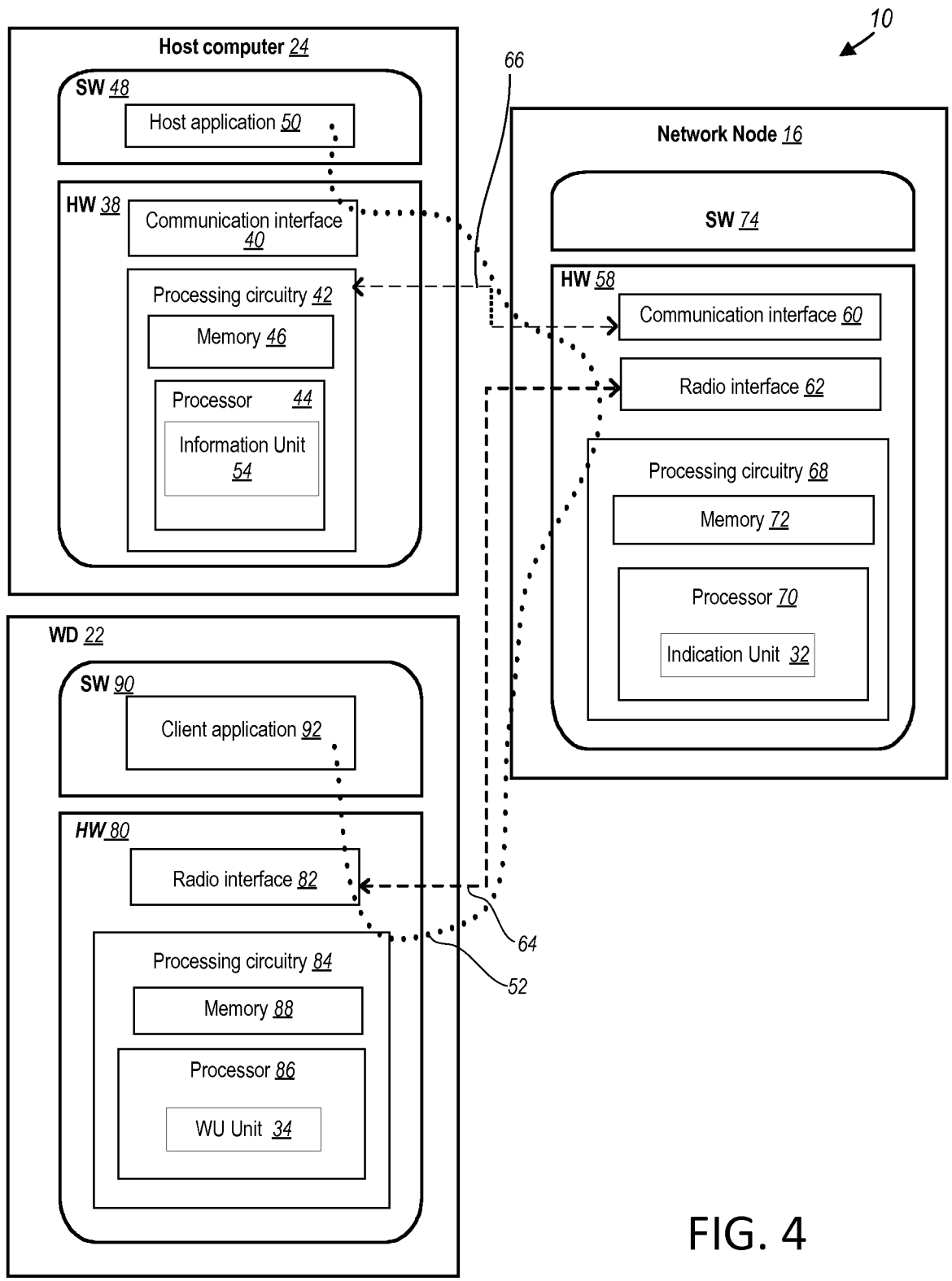
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular, empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as indication unit 32, and WU unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
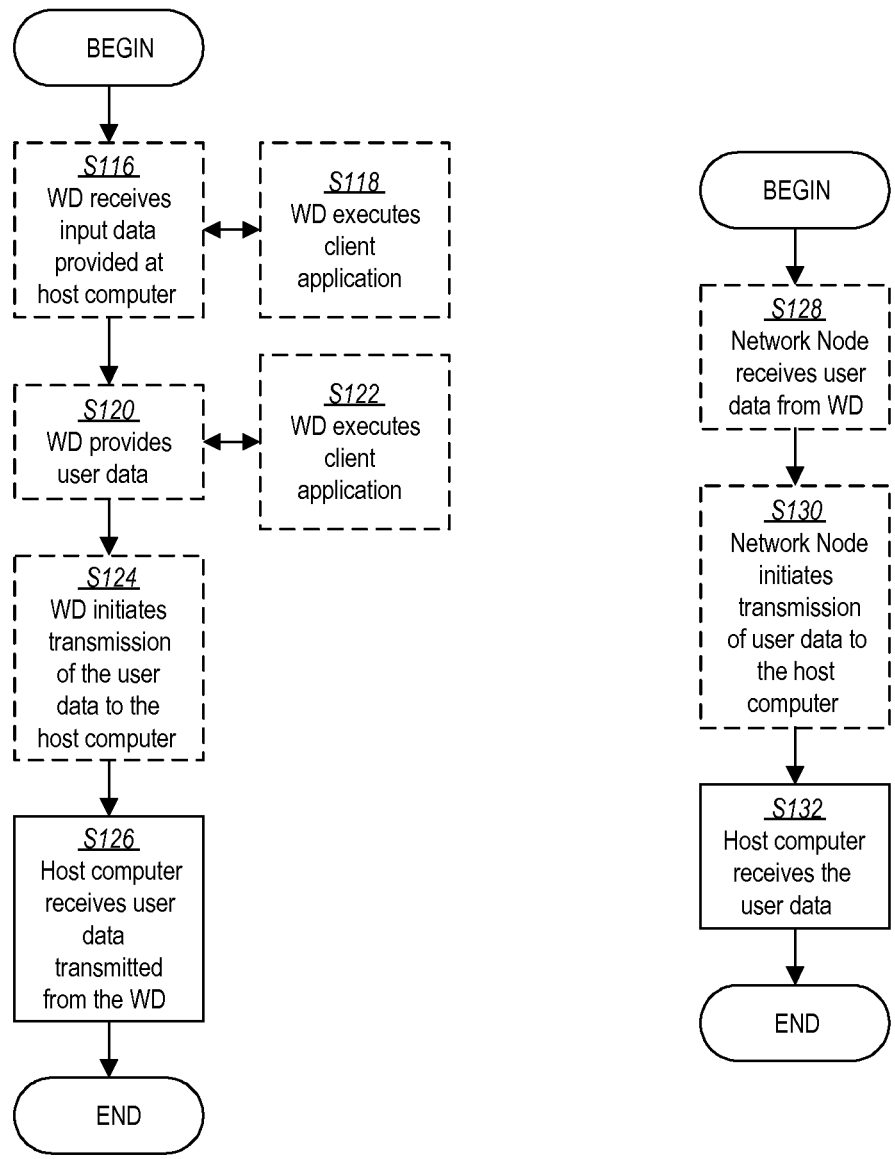
FIG. 7 is a flow chart illustrating exemplary methods implemented in a communication system including a host computer, a network node and a wireless device for receiving user data from the wireless device at a host computer according to some embodiments of the present disclosure.
FIG. 8 is a flow chart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
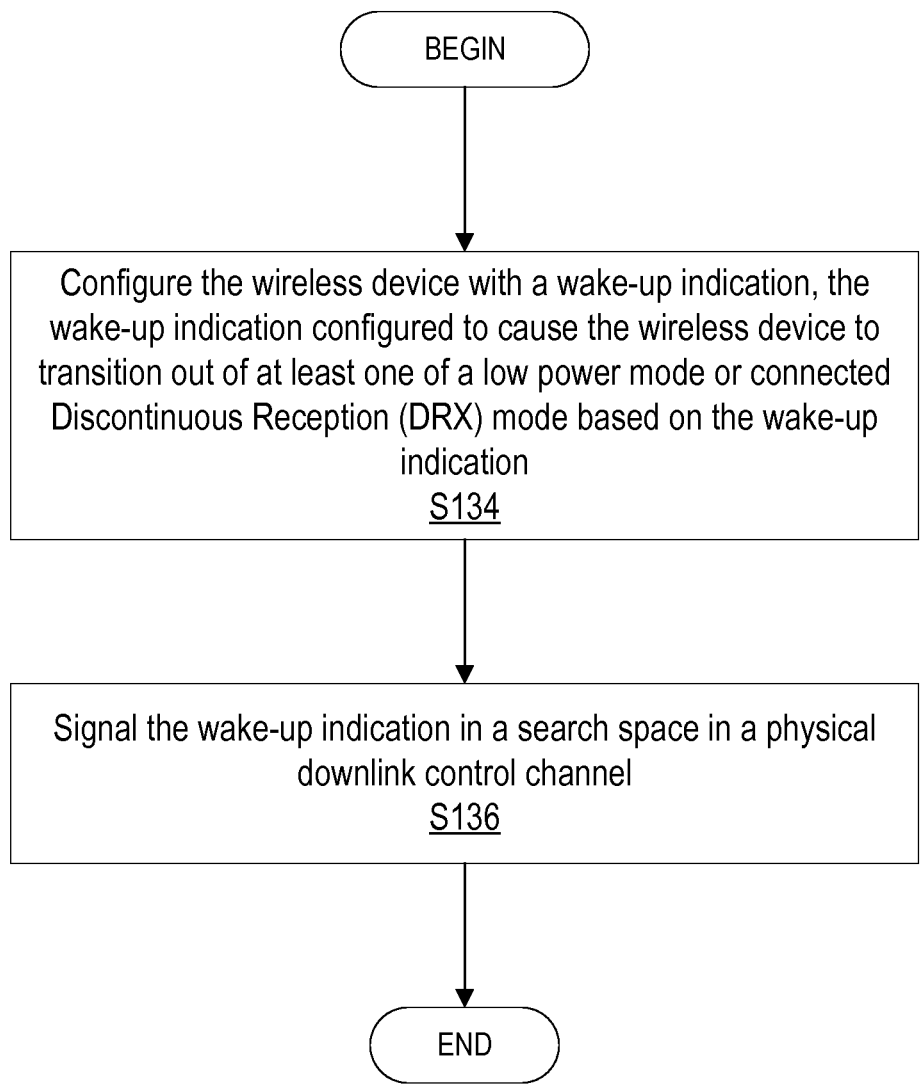
FIG. 9 is a flowchart of an exemplary process of in a network node for signaling a wake-up indication according to some embodiments of the present disclosure.

FIG. 9 is a flowchart of an exemplary process that may be performed at least in part by indication unit 32 in a network node 16 for signaling a wake-up indication in a search space in a physical downlink control channel. One or more Blocks described herein may be performed by one or more elements of network node 16 such as processing circuitry 68, indication unit 32, radio interface 62, communication interface 60, etc. Network node 16 is configured to configure (Block S134), such as via processing circuitry 68, indication unit 32, processor 70, radio interface 62 and/or communication interface 60, the wireless device 22 with a wake-up indication, the wake-up indication configured to cause the wireless device 22 to transition out of at least one of a low power mode or connected Discontinuous Reception (DRX) mode based on the wake-up indication. The network node 16 is configured to signal (Block S136), such as via processing circuitry 68, indication unit 32, processor 70, radio interface 62 and/or communication interface 60, the wake-up indication in a search space in a physical downlink control channel.

In some embodiments, signaling the wake-up indication further includes signaling, such as via processing circuitry 68, indication unit 32, processor 70, radio interface 62 and/or communication interface 60, the wake-up indication before a physical downlink control channel transmission that schedules data for the wireless device 22. In some embodiments, the wake-up indication is wake-up downlink control information, WU-DCI. In some embodiments, signaling the wake-up indication further includes signaling, such as via processing circuitry 68, indication unit 32, processor 70, radio interface 62 and/or communication interface 60, the wake-up indication as part of a physical downlink control channel transmission that is separate from another physical downlink control channel transmission that schedules data to the wireless device 22. In some embodiments, signaling the wake-up indication further includes signaling, such as via processing circuitry 68, indication unit 32, processor 70, radio interface 62 and/or communication interface 60, the wake-up indication in at least one of a narrow bandwidth and a narrow search space. In some embodiments, signaling the wake-up indication further includes signaling, such as via processing circuitry 68, indication unit 32, processor 70, radio interface 62 and/or communication interface 60, the wake-up indication having a cyclic redundancy check, CRC, scrambled using a radio network temporary identifier associated with the wireless device 22. In some embodiments, signaling the wake-up indication further includes signaling, such as via processing circuitry 68, indication unit 32, processor 70, radio interface 62 and/or communication interface 60, the wake-up indication having a cyclic redundancy check, CRC, scrambled using a radio network temporary identifier associated with a wake-up group, the wireless device being a part of the wake-up group. In some embodiments, signaling the wake-up indication further includes signaling the wake-up indication as having dummy data. In some embodiments, signaling the wake-up indication further includes signaling, such as via processing circuitry 68, indication unit 32, processor 70, radio interface 62 and/or communication interface 60, the wake-up indication as having information about downlink data that the wireless device 22 can expect to receive before transitioning back to the at least one of the low power mode and the connected DRX mode. In some embodiments, the configuration of the wake-up indication indicates a timing offset between the signaled wake-up indication and a physical downlink control channel transmission that schedules data for the wireless device 22.

In one or more embodiments, the wake-up indication is transmitted before a physical downlink control channel transmission that schedules data for the wireless device. In one or more embodiments, the wake-up indication is wake-up downlink control information (WU-DCI). In one or more embodiments, the signaling of the wake-up indication is part of physical downlink control channel transmission that is separate from another physical downlink control channel transmission that schedules data to the wireless device. In one or more embodiments, the wake-up indication is provided in a narrow bandwidth or narrow search space.

Figure 10:
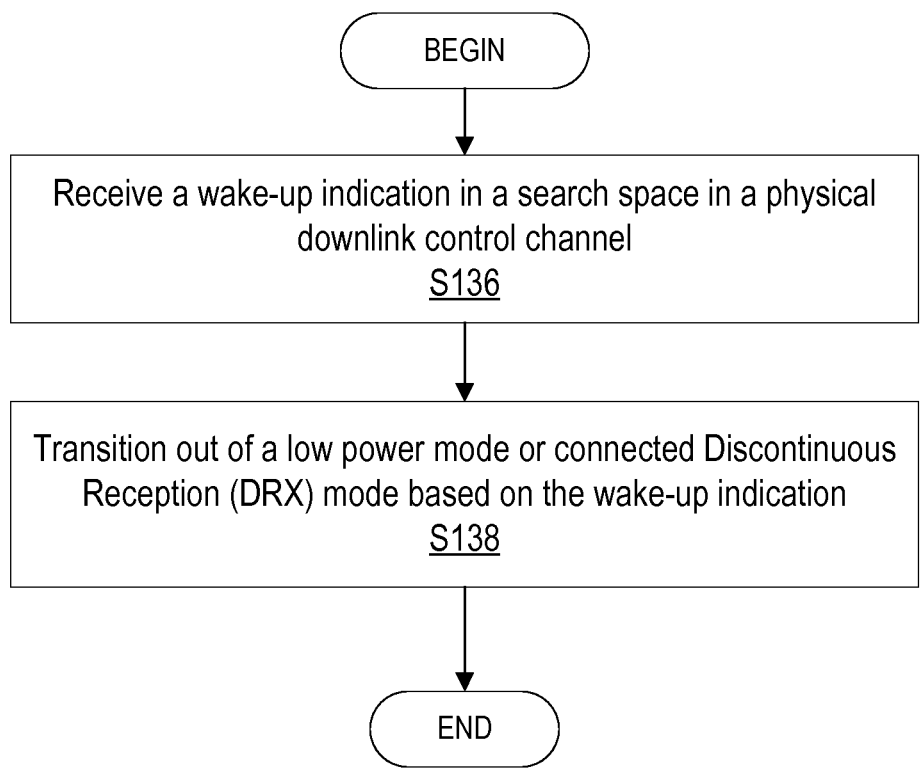
FIG. 10 is a flowchart of an exemplary process in a wireless device for transitioning out of a mode or state based on a wake-up indication according to some embodiments of the present disclosure.

FIG. 10 is a flowchart of an exemplary process in a wireless device 22 according to some embodiments of the present disclosure. It is noted that one or more Blocks described herein may be performed by one or more elements of WD 22 such as that may be performed by WU unit 34, processing circuitry 84, processor 86, radio interface 82, etc. WD 22 is configured to receive (Block S136), such as via WU unit 34, processing circuitry 84, processor 86 and/or radio interface 82, a wake-up indication in a search space in a physical downlink control channel. WD 22 is configured to transition (Block S138), such as via WU unit 34, processing circuitry 84, processor 86 and/or radio interface 82, out of a low power mode or connected Discontinuous Reception (DRX) mode based on the wake-up indication.

In some embodiments, receiving the wake-up indication further includes receiving, such as via WU unit 34, processing circuitry 84, processor 86 and/or radio interface 82, the wake-up indication before a physical downlink control channel transmission that schedules data for the wireless device 22. In some embodiments, the wake-up indication is wake-up downlink control information, WU-DCI. In some embodiments, receiving the wake-up indication further includes receiving, such as via WU unit 34, processing circuitry 84, processor 86 and/or radio interface 82, the wake-up indication as part of a physical downlink control channel transmission that is separate from another physical downlink control channel transmission that schedules data to the wireless device 22. In some embodiments, receiving the wake-up indication further includes receiving, such as via WU unit 34, processing circuitry 84, processor 86 and/or radio interface 82, the wake-up indication in at least one of a narrow bandwidth and a narrow search space. In some embodiments, receiving the wake-up indication further includes performing, such as via WU unit 34, processing circuitry 84, processor 86 and/or radio interface 82, a cyclic redundancy check, CRC, using a radio network temporary identifier associated with the wireless device 22. In some embodiments, receiving the wake-up indication further includes performing, such as via WU unit 34, processing circuitry 84, processor 86 and/or radio interface 82, a cyclic redundancy check, CRC, using a radio network temporary identifier associated with a wake-up group, the wireless device being a part of the wake-up group. In some embodiments, the received wake-up indication includes dummy data. In some embodiments, the received wake-up indication includes information about downlink data that the wireless device 22 can expect to receive before transitioning back to the at least one of the low power mode and the connected DRX mode. In some embodiments, the method further includes receiving, such as via WU unit 34, processing circuitry 84, processor 86 and/or radio interface 82, from a network node 16, a configuration of the wake-up indication, the configuration indicating a timing offset between the received wake-up indication and a physical downlink control channel transmission that schedules data for the wireless device 22.

Having generally described arrangements for a wake-up indication in a search space in a physical downlink control channel where the wake-up indication is configured to cause the wireless device to transition out of a low power mode or connected Discontinuous Reception (DRX) mode, details for these arrangements, functions and processes are provided as follows, and which may be implemented by the network node 16, wireless device 22 and/or host computer 24.

Embodiments provide a wake-up indication in a search space in a physical downlink control channel where the wake-up indication is configured to cause the wireless device to transition out of a low power mode or connected Discontinuous Reception (DRX) mode WU-DCI (i.e., wake up indication) design The WU-DCI is a DCI transmission that may not schedule PDSCH data or carry conventional DL signaling (e.g., DL HARQ or UL grant). The CRC may be scrambled with the C-RNTI of the targeted WD 22 or a WUG-RNTI (wake-up group) where the WD 22 has been configured. The WUG-RNTI may be called any name, such as, for example, a power-saving RNTI (PS-RNTI).

In some embodiments, the DCI may carry dummy data and the WD 22 receives the WU message by virtue of a successful CRC check using its C-RNTI or a WU-group-RNTI. In other embodiments, when group-WU is employed, the DCI may additionally contain C-RNTI(s) of the targeted WDs 22 in the group.

In some embodiments, the WU-DCI may, however also carry additional information to the targeted WD 22 or WD group. The DCI may use, e.g., the DCI format 1-0, with some fields optionally redefined or reallocated to WU-specific information.

Figure 11:
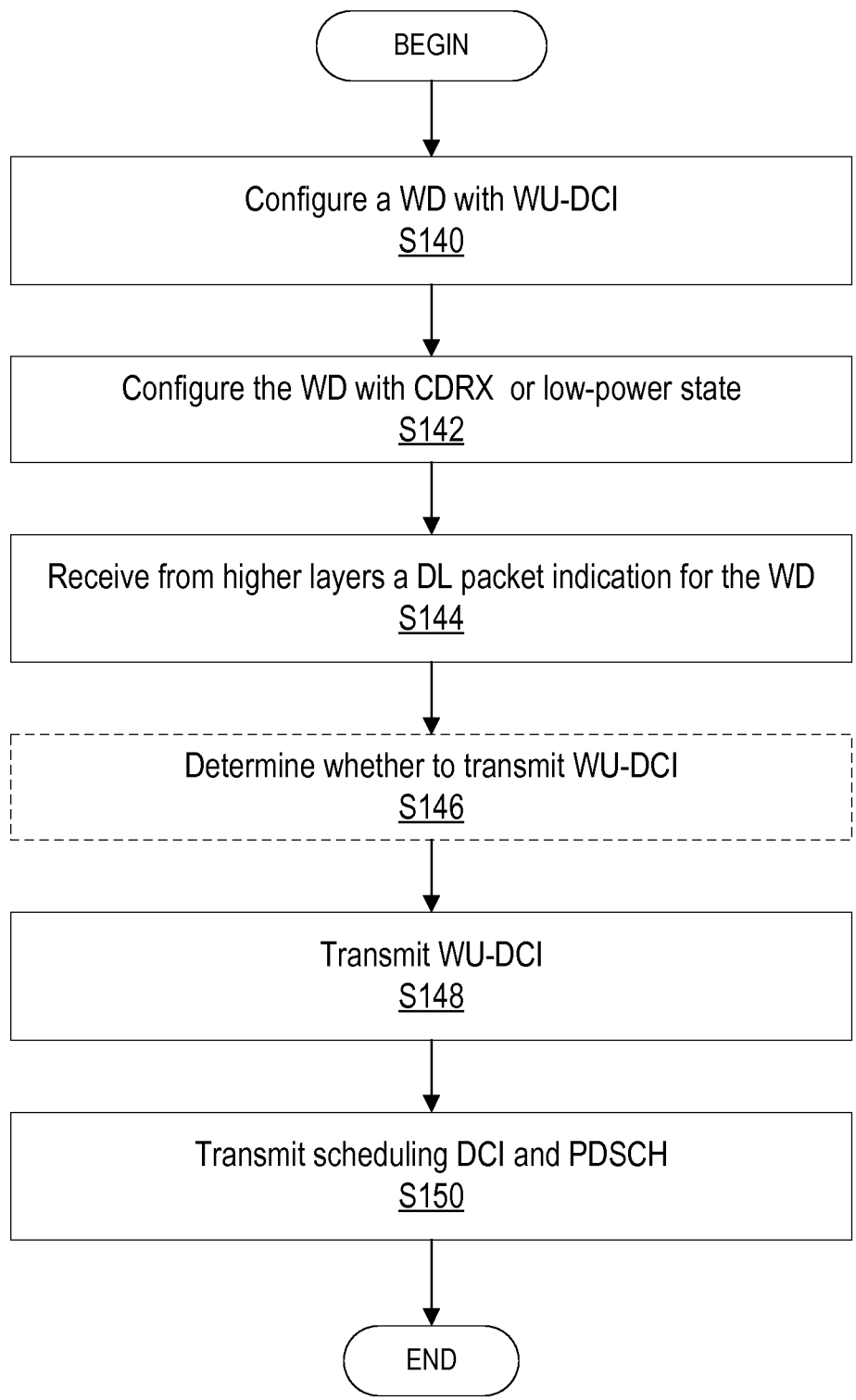
FIG. 11 is a flowchart of another exemplary process of in a network node for signaling a wake-up indication according to some embodiments of the present disclosure.

FIG. 11 is a flow diagram of another example process of indication unit 32 of network node 16 (e.g., gNB) in conjunction with other elements of network node 16 such as processing circuitry 68, radio interface 62, communication interface 60, etc. Network node 16 is configured to configure (Block S140) a WD 22 with WU-DCI. Network node 16 is configured to configure (Block S142) the WD 22 with DRX or low power state. Network node 16 is configured to receive (Block S144) from higher layers a downlink (DL) packet indication for the WD 22. Network node 16 is configured to, optionally, determine (Block S146) whether to transmit WU-DCI. Network node 16 is configured to transmit (Block S148) WU-DCI. Network node 16 is configured to transmit (Block S150) scheduling DCI and PDSCH As reflected in the flow, the WU-DCI may be utilized while the WD 22 is configured in CDRX or in a permanent low-power/energy-saving state (distinct from RRC_INACTIVE). The WD 22 may thus be in RRC_CONNECTED state, possibly a new variant of the state, e.g. a sub-state, but the WUS may also be configured for a WD 22 in a low-power/energy-saving state, such as RRC_IDLE state or another, possibly new low-power/energy-saving state. In some embodiments, configuring for a WD 22 in RRC_CONNECTED state is favorable since a WU-DCI transmission is not required for every scheduling DCI. In Block S140, a WD 22 may configured for according to existing procedures. This includes, e.g., configuring timer settings to enter, period, on-time (duty cycle), etc. Alternatively, it may be configured to a low-power state without predetermined occasions for PDCCH reception.

In Block S142, the WD 22 is configured to use the WU-DCI. Configuration parameters may include a search space for the PDCCH (which in turn includes one or more of CORESET, slot/symbol timing, Aggregation Level values, DCI format, etc.), as well as timing offset info between a received WU-DCI and the PDCCH transmission the WD 22 is associated with. The search space may be common or WD-specific. In WD 22 capability or other signaling, the WD 22 may indicate its preferred WU-DCI BW (e.g., the number of PRBs), which the network node 16 or NW may consider when configuring the WU-DCI. Optionally, the WD 22 may indicate the expected energy savings associated with its of its preferred WU-DCI BWs (e.g., for X number of PRBs, Y amount of energy savings can be expected). The NW or network node 16 can then consider which WUS-DCI BW setting is the optimal for the WD 22, based on the current load in the cell and the WD traffic profiles.

Additionally, the WD 22 may be configured with a WU-group membership and provided a WUG-RNTI. The latter approach allows a single WU-DCI transmission to activate multiple WD 22 for impending PDCCH/PDSCH reception. The WD 22 may also be configured to either wake up when its WUG-RNTI is detected or if the DCI scrambled with its WUG-RNTI is replaced by the WD's C-RNTI.

In one embodiment, the WDs 22 may be grouped according to their WU-DCI BW preferences. The WD 22 may provide its WU-DCI BW preferences to the network through capability signaling, e.g., when the WD 22 registers with the network, or the using other RRC signaling while in RRC_CONNECTED state or the WU-DCI BW preferences may be provided through subscription information.

As the number of RNTIs is limited in a cell, in one embodiment, the network configures the WD 22 with an explicit RNTI, which the WU-DCI is scrambled. This RNTI from WD 22 perspective is unique, but the network can configure other WDs 22 with the same RNTI to group the WDs 22 together. Also, the same RNTI can be assigned to several WDs 22 monitoring different CORESETs for the WU-DCI.

In another embodiment, the WDs 22 may be grouped into WUG-RNTIs based on the most significant bits of the WDs' C-RNTIs, such that WDs 22 sharing the same significant bits of the C-RNTI are assigned the same WUG-RNTI. With this embodiment, when the C-RNTI of a specific one of the WDs 22 in the group is to be indicated in the WU-DCI, then only the remaining least significant bits of the WD's C-RNTI need to be explicitly indicated in the WU-DCI, which reduces the required number of bits, which facilitates reduction of the bandwidth and usage of robust MSC.

In Block S144, the network node 16 such as gNB (lower-layer operation) receives from higher layers (e.g. MAC/scheduler) information that a DL data packet is to be transmitted, implying imminent PDCCH/PDSCH transmission.

In Block S146, if the WD 22 is in the CDRX state, the network node 16 such as gNB may determine whether the WU-DCI should be transmitted. (If the WD 22 is not in CDRX but in a low-power/energy-saving state where it monitors the PDCCH for paging in certain paging occasions, the network node 16 may determine whether the WU-DCI should be transmitted or the DL data can wait until the next regular paging occasion. If the WD 22 is configured in a permanent low-power/low-energy state, the WU-DCI will always be transmitted when data transmission is indicated form higher layers (Block S144). The network node 16 may select to transmit the WU-DCI if one or several of the predefined conditions are met. Some non-exclusive examples of the predefined conditions are:

- if the network node 16 has resources to send PDCCH/PDSCH.
- if the data indicated in Block S144 is latency-intolerant and the time remaining to the next CDRX on-time interval exceeds the allowed latency.
- If the anticipated network node 16 traffic load at the WD's next CDRX on-time interval exceeds a threshold and the current traffic load is lower.
- If the WU-DCI is scrambled with the WD's C-RNTI.
- If the WU-DCI is scrambled with the WUG-RNTI and the embodiment where the targeted WD's C-RNTI is included in the WU-DCI is used.
- If the DL data can be transmitted in a single transport block (while if the DL data requires more than one transport block, the network node 16 waits until the next on-time interval).
- Based on WD capability signaling or battery-status signaling, e.g., for the most energy-deprived WDs 22 the network node 16 may choose to wait until the next on-time interval, but for less energy-deprived WDs 22, the network node 16 may choose to transmit the WU-DCI to be able to forward the DL data earlier.
- If the WU-DCI is scrambled with the WUG-RNTI and DL data is pending for more than one WD 22 (or more than X WDs 22) in the group of WDs 22 sharing the same WUG-RNTI.
- Based on any combination of the above.

Generally, the WU-DCI may be most beneficial for low-load WDs operating with long CDRX cycles. For high-load WDs 22 with frequent transmissions, the network node 16 may choose not to transmit the WU-DCI since it would result in two PDCCH transmissions per PDSCH. Note that if the WU-DCI is not transmitted, the data indicated in Block 110 can be transmitted at the next CDRX on-time interval.

In one embodiment, the network node 16 or other network element can turn off the use of WU-DCI (either permanently or temporarily), by using one or more bits or one or more fields in the WU-DCI. That is, based on the traffic or other factors, the network node 16 or the network can indicate that during a given time the WU-DCI is not used, or the WU-DCI is turned off permanently until the network node 16 or the network turns WU-DCI on again. Later, if the network node 16 or the network element determines to turn the WU-DCI ON again, then the network node 16 or network element can indicate this either via RRC signaling and/or introduce (or redefine) a field in the regular DCI that the WD 22 monitors.

If group-WU-DCI is used, the decision to transmit the WU-DCI may be made if any of the WDs 22 in the group require an indication.

If it is determined in Block S146 to transmit the WU-DCI, the WU-DCI is transmitted in Block S148. The transmission constitutes a PDCCH transmission according to the previously configured search space, RNTI, and other parameters. In one embodiment, the WU-DCI may also contain an indication of the number of transport blocks that may be used for the pending DL data, i.e., how many independent (i.e., excluding HARQ retransmissions) DL transmissions that may be used for the DL data, so that the WD 22 knows how many (independent) transmissions/transport blocks it is expected to receive before it can go back to sleep again.

In Block S150, the scheduling PDCCH transmission is performed, temporally or temporarily offset from the WU-DCI according to the previous configuration. The time offset is chosen to be sufficient for the WD 22 to transition from the low-power mode to fully operational mode, and may range from multiple symbols to multiple slots, typically in the range of hundreds of us to various ms. The offset may be indicated as an exact time or as a window, i.e., as a range of time within which the scheduling PDCCH transmission is to occur. In one embodiment, the network node 16 indicates in the DCI scheduling the last part of the DL data that the WD 22 can go back to off-mode or other low-power/energy-saving state after receiving the PDSCH scheduled by the DCI (including possible HARQ retransmissions).

Figure 12:
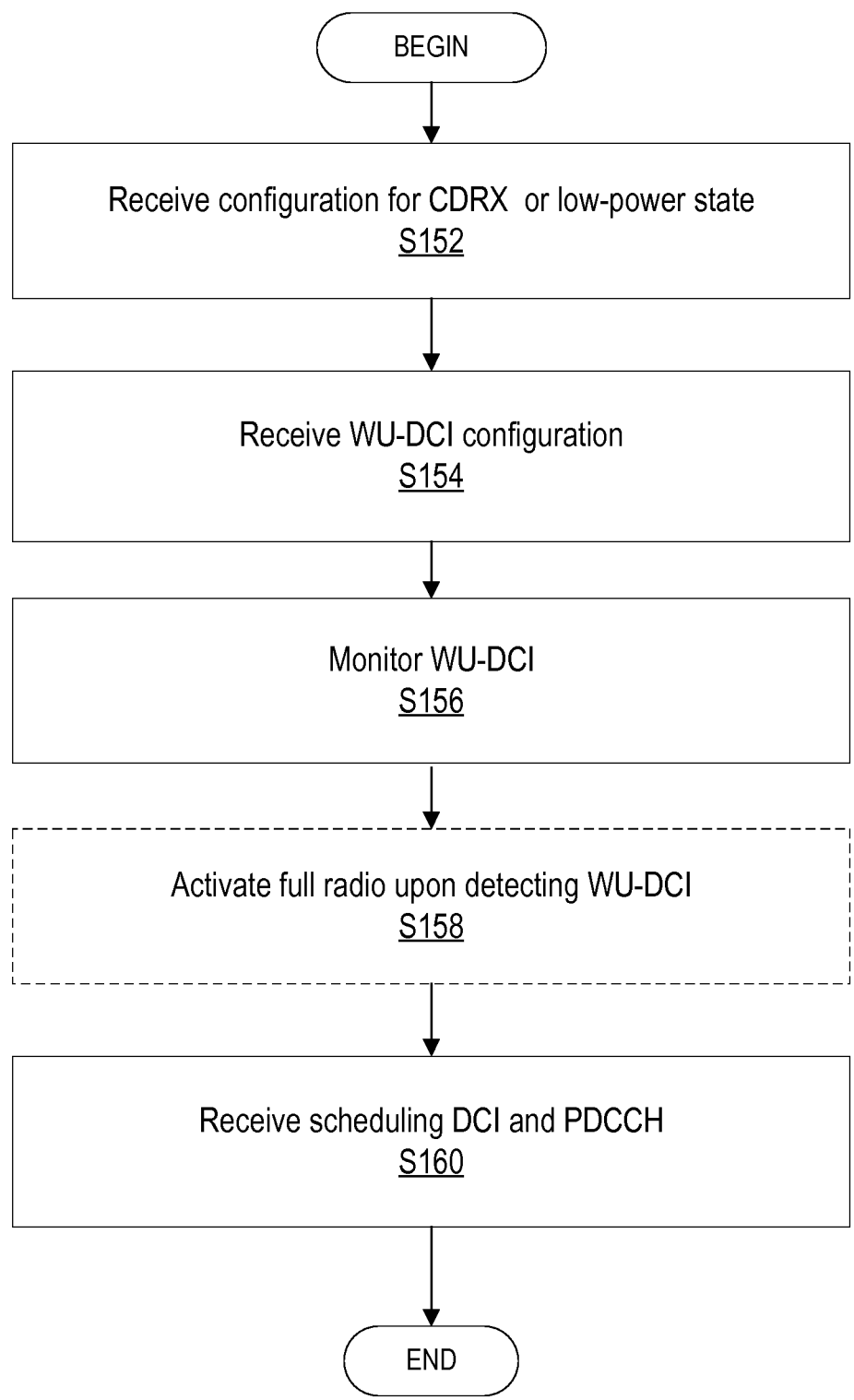
FIG. 12 is a flowchart of another exemplary process in a wireless device for transitioning out of a mode or state based on a wake-up indication according to some embodiments of the present disclosure.

FIG. 12 is a flow diagram of another embodiment of the process of WU unit 34 and other elements of WD 22 such as processing circuitry 84, radio interface 82, etc., in accordance with the principles of the disclosure. Matching steps with the network node 16 flow are indicated in bold (offset Block S152), details in those Blocks provided in the network node 16 descriptions also apply to the WD 22 description. One or more Blocks may be performed by one or more elements of WD 22 such as by processing circuitry 84, radio interface 82, etc. WD 22 is configured to receive (Block S152) a configuration for DRX or low-power state. WD 22 is configured to receive (Block S154) WU-DCI configuration. WD 22 is configured to monitor (Block S156) WU-DCI. WD 22 is configured to activate (Block S158) full radio upon detecting WU-DCI. WD 22 is configured to receive (Block S160) scheduling DCI and PDCCH.

In Block S152, the WD 22 is configured to operate in CDRX a permanent low-power state, and in Block S154, WD 22 is configured with WU-DCI, in single-WD-WU or group-WU mode.

In Block S156, the WD is operating in a low-power state, either in a permanent low-power state or in the low-power phase in its CDRX cycle. WD 22 may have its main receiver deactivated, and operating a separate low-power receiver (e.g., a WUR), or WD 22 may operate its main receiver in a low-power mode. The WD 22 may activate its low-power receiver according to the WU-DCI search space configuration and perform WU-DCI detection attempts according to it C-RNTI or the WUG-RNTI. In some embodiments, if an ultra-low-power WUR is used or if the WU-DCI search space implies frequent detection attempts, the low-power receiver may be continuously activated.

In Block S158, if the WU-DCI is detected, the WD 22 powers up the full receiver used to receive the scheduling PDCCH and/or the PDSCH. In Block S160, WD 22 then searches for the scheduling PDCCH, given the configured WU-DCI-to-scheduling-DCI time offset and the search space for the scheduling PDCCH. Upon detecting the PDCCH, WD 22 receives the PDSCH accordingly. If the WU-DCI contained an indication of the number of transport blocks that will be used for the pending DL data, i.e., how many independent (i.e. excluding HARQ retransmissions) DL transmissions would be used for the DL data, the WD 22 keeps the full receiver active until all the indicated (independent) PDSCH transmissions/transport blocks (including HARQ retransmissions) have been received. If the WD 22 finds an indication in a scheduling DCI that the PDSCH transmission scheduled by the DCI is the last one for the DL data triggered the network node 16 to transmit the WU-DCI, then the WD 22 goes back to off-mode or other low-power/ energy-saving state after receiving the PDSCH scheduled by the DCI (including possible HARQ retransmissions).

Figure 13:
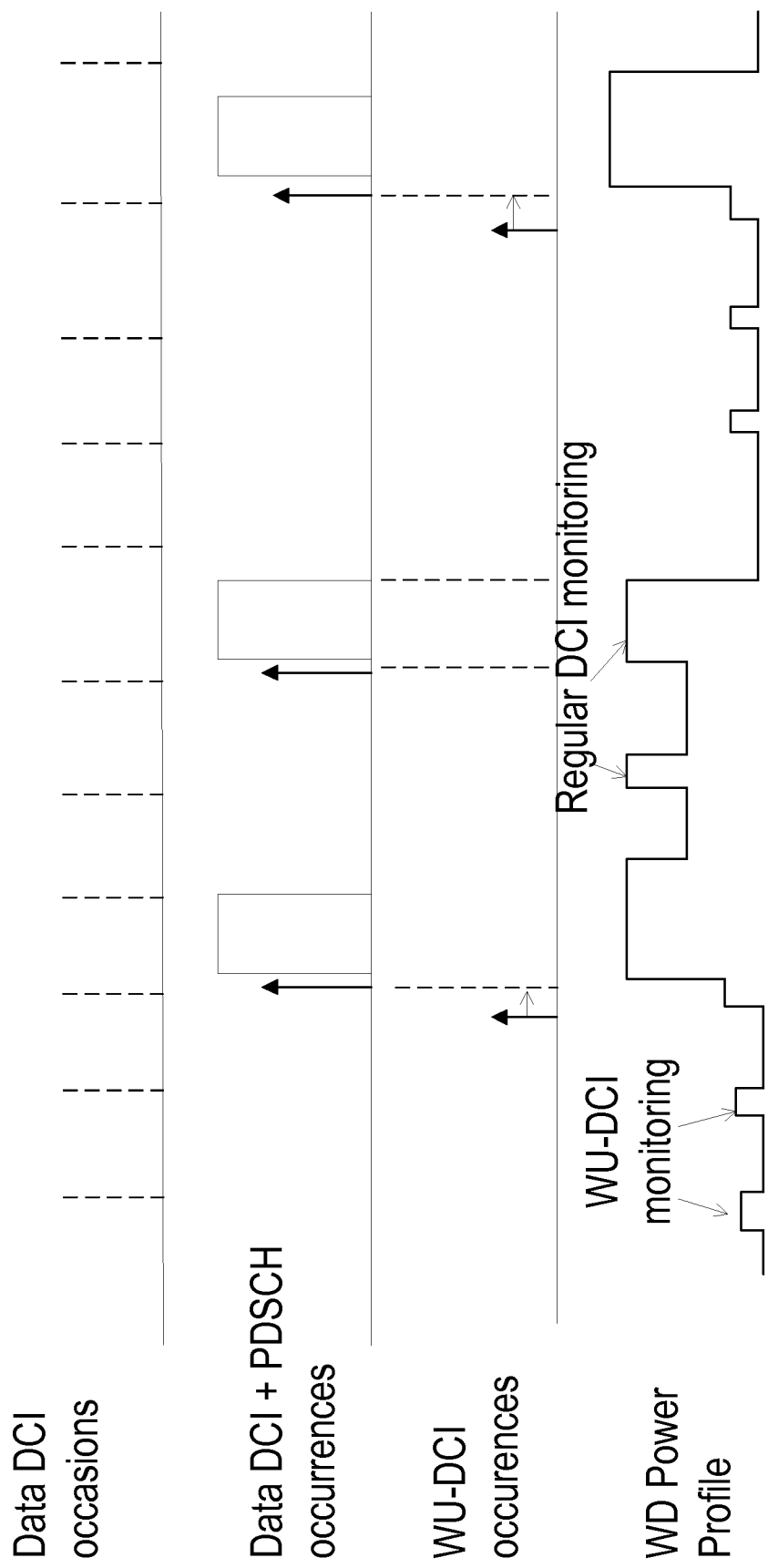
FIG. 13 is a timing diagram illustrating WU-DCI in accordance with the principles of the disclosure.

FIG. 13 is a timing diagram illustrating an example of how WU-DCI may be employed outside the ON-time. The WD power profile is also illustrated. The WU-DCI monitoring power consumption in an off-state may be significantly lower than for regular DCI monitoring in the on-state since a different, low-power radio architecture may be used for narrow-BW signal reception and other RX/TX functions in RF and BB are turned off. The low-power RX may maintain T/F synchronization for detecting the PDCCH carrying the WU-DCI using internal clock/LO reference if the cycle and/or actual WU-DCI occurrence intervals are not too long. Otherwise, the low-power receiver may regularly wake up to re-synchronize using SSB or other signals transmitted by the network node 16.

Embodiment: WU-DCI with different format than scheduling DCI

As previously described, the WD 22 may be configured to use the WU-DCI with parameters such as CORESET, slot/ symbol timing, aggregation level values, or DCI format. These parameters can be configured to make the WUS easily decodable. This can be further extended: Since the payload of the WUS is typically small (even non-existent, since the reception of the WUS itself instructs the WD 22 to wake up, and no additional information is needed in the minimal case), the WUS can be constructed in a different way compared to using polar codes as done with PDCCH. In one embodiment, the WUS is placed on time-frequency resources in the same way as PDCCH (e.g., occupying certain CCE or REG), but uses a different coding than the corresponding scheduling DCI. Then, decoding can be done simpler than if running a polar decoder. One example is a matched filter on a WD-specific sequence, placed on a certain set of CCEs or REGs. By using resources configured in the same way as for PDCCH, the WUS is transparent to the rest of the system, while still being easily decodable.

In addition, some embodiments may include one or more of the following:

Embodiment A1. A network node configured to communicate with a wireless device (WD), the network node configured to, and/or comprising a radio interface and/or comprising processing circuitry configured to:

signal a wake-up indication in a search space in a physical downlink control channel, the wake-up indication configured to cause the wireless device to transition out of a low power mode or connected Discontinuous Reception (DRX) mode.

Embodiment A2. The network node of Embodiment A1, wherein the wake-up indication is transmitted before a physical downlink control channel transmission that schedules data for the wireless device.

Embodiment A3. The network node of Embodiment A1, wherein the wake-up indication is wake-up downlink control information (WU-DCI).

Embodiment A4. The network node of Embodiment A1, wherein the signaling of the wake-up indication is part of physical downlink control channel transmission that is separate from another physical downlink control channel transmission that schedules data to the wireless device.

Embodiment A5. The network node of Embodiment A1, wherein the wake-up indication is provided in a narrow bandwidth or narrow search space.

Embodiment B1. A method implemented in a network node, the method comprising signaling a wake-up indication in a search space in a physical downlink control channel, the wake-up indication configured to cause the wireless device to transition out of a low power mode or connected Discontinuous Reception (DRX) mode.

Embodiment B2. The method of Embodiment B1, wherein the wake-up indication is transmitted before a physical downlink control channel transmission that schedules data for the wireless device.

Embodiment B3. The method of Embodiment B1, wherein the wake-up indication is wake-up downlink control information (WU-DCI).

Embodiment B4. The method of Embodiment B1, wherein the signaling of the wake-up indication is part of physical downlink control channel transmission that is separate from another physical downlink control channel transmission that schedules data to the wireless device.

Embodiment B5. The method of Embodiment B1, wherein the wake-up indication is provided in a narrow bandwidth or narrow search space.

Embodiment C1. A wireless device (WD) configured to communicate with a network node, the WD configured to, and/or comprising a radio interface and/or processing circuitry configured to:

receive a wake-up indication in a search space in a physical downlink control channel; and transition out of a low power mode or connected Discontinuous Reception (DRX) mode based on the wake-up indication.

Embodiment C2. The WD of Embodiment C1, wherein the wake-up indication is received before a physical downlink control channel transmission that schedules data for the wireless device.

Embodiment C3. The WD of Embodiment C1, wherein the wake-up indication is wake-up downlink control information (WU-DCI).

Embodiment C4. The WD of Embodiment C1, wherein the wake-up indication is part of a physical downlink control channel transmission that is separate from another physical downlink control channel transmission that schedules data to the wireless device.

Embodiment C5. The WD of Embodiment C1, wherein the wake-up indication is provided in a narrow bandwidth or narrow search space.

Embodiment D1. A method implemented in a wireless device (WD), the method comprising:

receiving a wake-up indication in a search space in a physical downlink control channel; and transitioning out of a low power mode or connected Discontinuous Reception (DRX) mode based on the wake-up indication.

Embodiment D2. The method of Embodiment D1, wherein the wake-up indication is received before a physical downlink control channel transmission that schedules data for the wireless device.

Embodiment D3. The method of Embodiment D1, wherein the wake-up indication is wake-up downlink control information (WU-DCI).

Embodiment D4. The method of Embodiment D1, wherein the wake-up indication is part of a physical downlink control channel transmission that is separate from another physical downlink control channel transmission that schedules data to the wireless device.

Embodiment D5. The method of Embodiment D1, wherein the wake-up indication is provided in a narrow bandwidth or narrow search space.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| 5G | 5th Generation |
| BB | Baseband |
| BW | Bandwidth |
| CDRX | Connected mode DRX (i.e. DRX in RRC_CONNECTED state) |
| CRC | Cyclic Redundancy Check |
| DCI | Downlink Control Information |
| DL | Downlink |
| DRX | Discontinuous Reception |
| gNB | A radio base station in 5G/NR. |
| HARQ | Hybrid Automatic Repeat Request |
| IoT | Internet of Things |

-continued

| Abbreviation | Explanation |
|---|---|
| LO | Local Oscillator |
| LTE | Long Term Evolution |
| MAC | Medium Access Control |
| MCS | Modulation and Coding Scheme |
| mMTC | massive MTC (referring to scenarios with ubiquitously deployed MTC devices) |
| ms | millisecond |
| MTC | Machine Type Communication |
| NB | Narrowband |
| NB-IoT | Narrowband Internet of Things |
| NR | New Radio |
| NW | Network |
| PDCCH | Physical Downlink Control Channel |
| PDSCH | Physical Downlink Shared Channel |
| RF | Radio Frequency |
| RNTI | Radio Network Temporary Identifier |
| RRC | Radio Resource Control |
| RX | Receiver/Reception |
| SSB | Synchronization Signal Block |
| T/F | Time/Frequency |
| TX | Transmitter/Transmission |
| UE | User Equipment |
| UL | Uplink |
| WU | Wake-up |
| WUG | Wake-up Group |
| WUR | Wake-up Radio/Wake-up Receiver |
| WUS | Wake-up Signal/Wake-up Signaling |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method implemented in a wireless device, the method comprising:
receiving a wake-up indication in a search space in a physical downlink control channel (PDCCH), the wake-up indication being a non-scheduling wake-up downlink control information (WU-DCI) indication, the wake-up indication being received as part of a first PDCCH transmission that is separate from a second PDCCH transmission that schedules data to the wireless device, the wake-up indication being received in:
a first bandwidth associated with the WU-DCI indication in the first PDCCH transmission which is narrower than a second bandwidth associated with the second PDCCH transmission; and
a first search space associated with the WU-DCI indication in the first PDCCH transmission which is narrower than a second search space associated with the second PDCCH transmission; and
transitioning out of a low power phase of a connected Discontinuous Reception (cDRX) cycle based on the wake-up indication.

2. The method of claim 1, wherein the receiving the wake-up indication further comprises:
the receiving the wake-up indication being before the second PDCCH transmission that schedules data for the wireless device.

3. The method of claim 1, wherein the receiving the wake-up indication further comprises:
performing a cyclic redundancy check, CRC, using a radio network temporary identifier associated with the wireless device.

4. The method of claim 1, wherein the receiving the wake-up indication further comprises:
performing a cyclic redundancy check, CRC, using a radio network temporary identifier associated with a wake-up group, the wireless device being a part of the wake-up group.

5. The method of claim 1, wherein the received wake-up indication includes dummy data.

6. The method of claim 1, wherein the received wake-up indication includes information about downlink data that the wireless device can expect to receive before transitioning back to the low power phase of the cDRX cycle.

7. The method of claim 1, further comprising:
receiving, from a network node, a configuration of the wake-up indication, the configuration indicating a timing offset between the received wake-up indication and the second PDCCH transmission that schedules data for the wireless device.

8. A method implemented by a network node, the method comprising:
transmitting a wake-up indication in a physical downlink control channel (PDCCH) for configuring a wireless device with the wake-up indication, the wake-up indication being a non-scheduling wake-up downlink control information (WU-DCI) indication, the wake-up indication being transmitted as part of a first PDCCH transmission that is separate from a second PDCCH transmission that schedules data to the wireless device, the wake-up indication being transmitted in:
a first bandwidth associated with the WU-DCI indication in the first PDCCH transmission which is narrower than a second bandwidth associated with the second PDCCH transmission; and
a first search space associated with the WU-DCI indication in the first PDCCH transmission which is narrower than a second search space associated with the second PDCCH transmission, the wake-up indication configured to cause the wireless device to transition out of a low power phase of a connected Discontinuous Reception (cDRX) cycle based on the wake-up indication.

9. The method of claim 8, wherein the transmitting the wake-up indication further comprises:
the transmitting the wake-up indication being before the second PDCCH transmission that schedules data for the wireless device.

10. The method of claim 8, wherein the transmitting the wake-up indication further comprises:
the transmitting the wake-up indication having a cyclic redundancy check, CRC, scrambled using a radio network temporary identifier associated with the wireless device.

11. The method of claim 8, wherein the transmitting the wake-up indication further comprises:
the transmitting the wake-up indication having a cyclic redundancy check, CRC, scrambled using a radio network temporary identifier associated with a wake-up group, the wireless device being a part of the wake-up group.

12. The method of claim 8, wherein the transmitting the wake-up indication further comprises:
the transmitting the wake-up indication as having dummy data.

13. The method of claim 8, wherein the transmitting the wake-up indication further comprises:
the transmitting the wake-up indication as having information about downlink data that the wireless device can expect to receive before transitioning back to the low power phase of the cDRX cycle.

14. The method of claim 8, wherein a configuration of the wake-up indication indicates a timing offset between the first PDCCH transmission associated with the wake-up indication and the second PDCCH transmission that schedules data for the wireless device.

15. A wireless device configured to communicate with a network node, the wireless device comprising processing circuitry, the processing circuitry configured to cause the wireless device to:
- receive a wake-up indication in a search space in a physical downlink control channel (PDCCH), the wake-up indication being a non-scheduling wake-up downlink control information (WU-DCI) indication, the wake-up indication being received as part of a first PDCCH transmission that is separate from a second PDCCH transmission that schedules data to the wireless device, the wake-up indication being received in:
  - a first bandwidth associated with the WU-DCI indication in the first PDCCH transmission which is narrower than a second bandwidth associated with the second PDCCH transmission; and
  - a first search space associated with the WU-DCI indication in the first PDCCH transmission which is narrower than a second search space associated with the second PDCCH transmission; and
- transition out of a low power phase of a connected Discontinuous Reception (cDRX) cycle based on the wake-up indication.

16. The wireless device of claim 15, wherein the received wake-up indication includes information about downlink data that the wireless device can expect to receive before transitioning back to the low power phase of the cDRX cycle.

17. A network node configured to communicate with a wireless device, the network node comprising processing circuitry, the processing circuitry configured to cause the network node to:
- transmit a wake-up indication in a search space in a physical downlink control channel (PDCCH) for configuring the wireless device with a wake-up indication, the wake-up indication being a non-scheduling wake-up downlink control information (WU-DCI) indication, the wake-up indication being transmitted as part of a first PDCCH transmission that is separate from a second PDCCH transmission that schedules data to the wireless device, the wake-up indication being transmitted in:
  - a first bandwidth associated with the WU-DCI indication in the first PDCCH transmission which is narrower than a second bandwidth associated with the second PDCCH transmission; and
  - a first search space associated with the WU-DCI indication in the first PDCCH transmission which is narrower than a second search space associated with the second PDCCH transmission, the wake-up indication configured to cause the wireless device to transition out of a low power phase of a connected Discontinuous Reception (cDRX) cycle based on the wake-up indication.

18. The network node of claim 17, wherein the processing circuitry is further configured to transmit the wake-up indication:
- as having information about downlink data that the wireless device can expect to receive before transitioning back to the low power phase of the cDRX cycle.

* * * * *